Patented Jan. 8, 1935

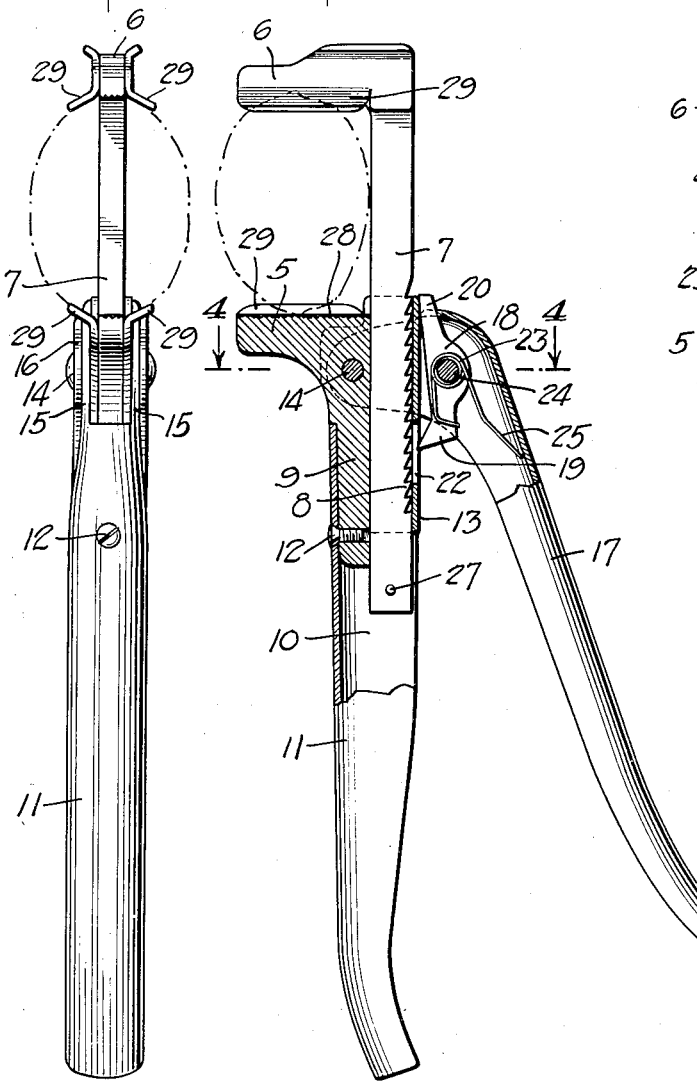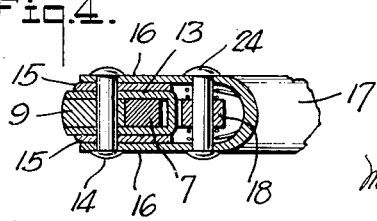

1,987,399

UNITED STATES PATENT OFFICE 1,987,399

NUT CRACKER

George N. Harris, Pala, Calif.

Application November 22, 1933, Serial No. 699,252

1 Claim. (Cl. 146—16)

This invention relates particularly to hand-actuated nut crackers, and same has for one of its essential objects the provision of novel, positively acting means for quickly effecting a preliminary adjustment with respect to each other, of co-operable cracking jaws in a manner to permit of convenient insertion therebetween of the nut to be cracked, and which thereafter will positively function to enable and cause gradual movements in respectively opposite directions to be imparted to one of the jaws in a way that will avoid the total collapse of the shell and an unintended mutilation or crushing of the meat, a feature long desired to be accomplished by means of hand operated nut cracking implements.

I have discovered that the shells of English walnuts, pecans, filberts, almonds, hazel nuts, and the like are more or less inherently resilient and that this inherent resiliency can be utilized to a very decided advantage in the work of controlling the amount of pressure to be applied to the shell, and it is largely due to this that I am able to accomplish the object first above referred to.

More generally speaking, the utility of the implement resides in the structural features which are so co-ordinated, designed and constructed as (1) to permit an approximate open adjustment of the mating jaws to be quickly made and the nut easily inserted between the jaws and securely engaged therewith; (2) to prevent the movable jaw from being adjusted beyond a limited distance toward the nut, but with just sufficient impingement thereagainst to tax the resiliency of the shell and gradually fracture same; and (3) to then, but under the absolute control of the operator and with the finest possible precision, cause the resilient power of the shell, when the latter is stressed as aforestated, to act upon the movable jaw of the implement in a way that will temporarily release the stress preparatory to the next movement of said jaw in an opposite or cracking direction.

To the attainment of the foregoing functional accomplishments, the invention consists in the novel features of the device and their relationship to each other hereinafter described and definitely pointed out in the hereto appended claim.

Accompanying and forming part of this specification is a drawing illustrative of the best practical embodiment of the invention of which I am at present cognizant, in which Figure 1 is a view in edge elevation of the implement;

Figure 2 is a view in side elevation thereof with parts shown in section;

Figure 3 is a view similar to Figure 2, showing the sliding jaw in a fixed position of adjustment;

Figure 4 is a transverse section taken on line 4—4 of Figure 2.

In carrying the invention into practice, use is made of a fixed jaw 5 and a co-operable sliding jaw 6, the latter having a long shank 7, formed with a longitudinal series of ratchet teeth 8.

The fixed jaw 5 has a tang 9 which extends into the channel 10 of a handgrip 11, the latter being of a contour to comfortably accommodate itself to the hand of the user. The jaw 5 is rendered fixed to the handgrip 11 by means of a fastening screw 12. A U-shaped strap or guide member 13 is contained within the channel 10 of said handgrip 11 and the same operatively receives the shank 7 of the aforementioned sliding jaw 6. A pin 14 passes through the tang 9, through the walls 15—15 of the handgrip 11, and through the side wings 16—16 of the lever 17. It is in this manner that the lever 17 can fulcrum about the pin 14, as will be clearly understood. The lever 17, like the handgrip 11, is also of a contour to comfortably fit the hand of the user, and, as illustrated, a dog 18 is pivoted between the walls of the lever and disposed in such relationship to the ratchet teeth 8 as to engage with any tooth thereof in a manner to be stated presently. It is formed at one end with a V-shaped nose 19 and its opposite end is formed with a tail piece 20, the latter adapted to ride over the smooth face 21 of the guide member 13. The nose 19 is adapted to be projected through an elongated slot 22 formed in said guide member so that it can be operatively made to engage with the ratchet teeth 8 when the lever 17 is moved to the position shown in Figure 3 of the drawing. A coil spring 23 extends about the supporting pivot 24 on which the dog is mounted to rock and the end 25 thereof freely bears against a portion of the lever 17, as shown in Figures 2 and 3. The opposite end of the spring extends around the part of the dog 18 at a point beneath the pivot 24 and in a manner to normally urge the nose 19 toward the teeth 8. Movement of the tail piece 20 of the dog is accommodated by providing a slot 26 in the lever 17, and it will be observed upon reference to Figure 3 that when the lever 17 is fully depressed the tail piece 20 bears firmly against the wall 21 of the guide member 13, at which time the nose 19 is fully engaged with one of the teeth 8 in a manner to positively prevent the sliding jaw 6 from sliding in either direction.

The incidental structural features of the implement include a stop pin 27 at the free end of the shank 7 and same is adapted to engage an adjacent end of the guide member 13 so as to limit the outward sliding movement of said jaw 6. The jaws 5 and 6 are in relative parallelism and each thereof is provided with a rasp-like surface 28 adapted to procure such purchase against the nut as to hold the latter against slipping or becoming displaced during the cracking operation. As a further means to this end, each of said jaws is provided with relatively diverging side wings 29—29.

From what has been stated, it will be appreciated that when it is desired to place a nut between the jaws 5 and 6, it is simply necessary to move the lever 17 to the position shown in Figure 2, at which time the jaw 6 can be readily moved to any position with respect to the jaw 5 until the required spacing is had for the insertion of a nut between both jaws as shown in said Figure 2. I have stated that I have designed an implement that will enable me to utilize the resiliency of the shell of the nut and thus enable the relative movements of the jaws to be controlled in a manner that will be more favorable to a cracking of the shell without crushing or mutilating the meat. If, therefore, the lever 17 is pressed inwardly from the position shown in Figure 2, the two jaws will be advanced against the nut so as to stress the elasticity of the shell. This may be done until the shell is slightly fractured, and when fractured, the lever 17 may be further advanced towards the handgrip 11 and until the nose 19 of the dog 18 engages an adjacent co-acting tooth 8 of the shank 7, after which a still further movement may be imparted to the lever 17 until the tail piece 20 is firmly advanced against the wall 21 of the guide member 13. At this last stated time, the dog becomes positively latched relatively to its engaged ratchet tooth and no further movement of the jaw 6 towards the jaw 5 can be effected. In consequence, it is impossible to so completely mash the shell as to crush the meat of the nut. An unskilled person may readily use the implement so that the meat of the nut can be removed without injuring same in any manner. The leverage action incident to the described relationship of the respective working parts is highly effective, and a minimum amount of manual force is required to crack nuts whose shells are quite hard.

While I have described the use of the invention in connection with hand actuated implements, it is not to be taken that I must necessarily confine myself in this respect. I have fully disclosed and described the invention for all purposes of the statutes, and it may be used in ways that will satisfy the desires of those skilled in the art to which the invention pertains.

Wherever herein I have employed the phrase "elastic range of the shell structure", same is to be understood to mean that range of movement of the structure when slightly stressed which will not entirely break down the structure to the extent that would cause such collapse thereof as would injure the meat of the nut.

What is claimed is:

A nut cracker comprising a fixed jaw, a slidable jaw co-operable with the fixed jaw, a hollow hand grip carried by the fixed jaw, a U-shaped guide member contained within the hand grip and having a wall exposed therefrom and provided with an elongated slot, a shank carried by the slidable jaw and received in the guide member, said shank having a longitudinal series of ratchet teeth disposed in confronting relation to the inner face of said exposed wall, a pivot pin carried by the fixed jaw, a lever mounted to fulcrum on said pin, a pin carried by the lever, a dog pivotally mounted on the last said pin to rock relatively to said exposed wall and along a path concentrically related to the axis of the first said pin, a spring co-operable with the dog and the lever to urge same into relatively angular positions and to enable the dog to yield relatively to said ratchet teeth, the dog having a substantially V-shaped nose formed to enter the slot and to co-act with the teeth of said shank to move the shank in one direction, and a tail portion formed on the dog and co-acting with the exposed wall of the guide member so as to rock thereon and adapted when the lever is rocked to one position to bear flatwise against said exposed wall and thereby positively latch the shank against movement in either direction until the lever is rocked in an opposite direction.

GEORGE N. HARRIS.